(12) United States Patent
Hestehave

(10) Patent No.: US 8,699,741 B2
(45) Date of Patent: Apr. 15, 2014

(54) HEADSET WITH MORE BUTTONS FOR ACTIVATING THE SAME SWITCH PAD

(75) Inventor: Klaus Hestehave, Søborg (DK)

(73) Assignee: GN Netcom A/S (DK)

( * ) Notice: Subject to any disclaimer, the term of this patent is extended or adjusted under 35 U.S.C. 154(b) by 702 days.

(21) Appl. No.: 13/012,256

(22) Filed: Jan. 24, 2011

(65) Prior Publication Data

US 2011/0164758 A1 Jul. 7, 2011

Related U.S. Application Data

(63) Continuation-in-part of application No. PCT/DK2008/000275, filed on Jul. 22, 2008.

(51) Int. Cl.
*H04R 25/00* (2006.01)

(52) U.S. Cl.
USPC ............ 381/376; 381/367; 381/370; 381/380

(58) Field of Classification Search
USPC .................................. 381/376, 367, 370, 380
See application file for complete search history.

(56) References Cited

U.S. PATENT DOCUMENTS

| | | | |
|---|---|---|---|
| 6,760,015 B2 * | 7/2004 | Ostergård et al. | 345/169 |
| 2007/0133836 A1 * | 6/2007 | Lee | 381/370 |
| 2008/0125186 A1 | 5/2008 | Chen | |

FOREIGN PATENT DOCUMENTS

| | | |
|---|---|---|
| JP | 01 187718 | 7/1989 |
| WO | WO 03/061249 | 7/2003 |

OTHER PUBLICATIONS

International Search Report for PCT/DK2008/000275.

* cited by examiner

*Primary Examiner* — Davetta W Goins
*Assistant Examiner* — Amir Etesam
(74) *Attorney, Agent, or Firm* — Altera Law Group, LLC

(57) ABSTRACT

A communication device (1), such as a headset, comprising a housing (2) with a housing wall (3) encapsulating a housing interior (13). An electronic circuit (11) is arranged in the housing interior (13), the electronic circuit (11) comprising a first momentary switch (8) and a first actuation member (6), which can be operated by a user from the outside of the housing (2), and which is adapted to actuate the first momentary switch (8). A second actuating member (7; 22), which can be operated by a user from the outside of the housing (2), is adapted to actuate the first momentary switch (8). The second actuating member (7) is adapted to move independently from the first actuating member (6). Further embodiments have multiple conductors in the switch for multiple functions.

12 Claims, 5 Drawing Sheets

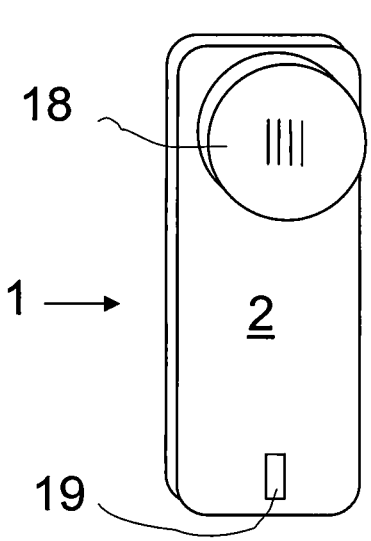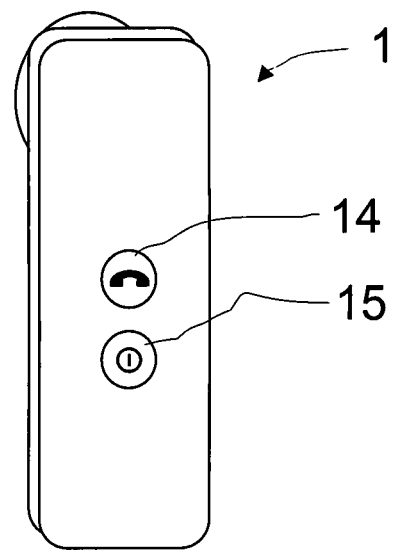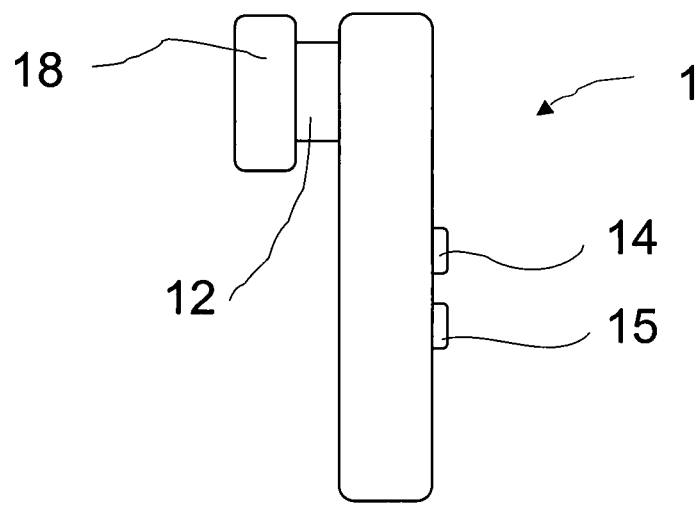

HEADSET WITH MORE BUTTONS FOR ACTIVATING THE SAME SWITCH PAD

CROSS-REFERENCE TO RELATED APPLICATION

This application is a Continuation-In-Part of co-pending International Application No. PCT/DK2008/000275, filed on 22 Jul. 2008.

TECHNICAL FIELD

The disclosure relates to a communication device comprising a housing with a housing wall encapsulating a housing interior, an electronic circuit arranged in the housing interior, the electronic circuit comprising a first momentary switch, a first actuator, which can be operated by a user from the outside of the housing, and which is exclusively adapted to actuate the first momentary switch.

BACKGROUND

Headsets and other compact communication devices like the one according to the preamble of claim 1 are produced and sold in a competitive market, where manufacturing costs are essential. Thus, such communications devices are often provided with a single multifunction button replacing two or more buttons. The Bluetooth headset Jabra BT2040 has such a multifunction button/switch which is used for turning the headset on and off, pairing the headset with a mobile phone, answering and end calls. The user presses the button for 3 seconds in order to turn the headset on and 5 seconds to turn it off. In order to pair it the user presses the button for 5 seconds when the headset is turned off. In order to answer and end calls the user taps the button, which means that the button is pressed down for less than 0.5 second. Such a design save costs, as only one button and one switch is needed, at the expense of user-friendliness. As only one button serves several functions the user, the user gets confused. Therefore, there is a need to enhance the user interfaces of such devices without substantially increasing the cost.

SUMMARY

An object of the disclosure is to provide the communication device according to preamble with a more intuitive user interface without adding significant cost.

A communication device is disclosed characterised in a second actuator, which can be operated by a user from the outside of the housing, and which is exclusively adapted to actuate the first momentary switch, the second actuator being adapted to move independently from the first actuator. Thus, the first and the second actuators can be dedicated to different functions and thus be marked with different functionality, although only one switch is used.

A momentary switch (preferably normally open) is a switch that returns to its normal position upon removal of the operating force. According to an embodiment, the switch is a push-to-make switch. Such a switch is also termed (ON)-OFF switch. It returns to its normally open (off) position when operation force is removed.

According to another embodiment, the switch is a membrane switch. A membrane switch is as a momentary switch device in which at least one contact is on, or made of, a flexible substrate. Thus, the membrane switch can be fastened, e.g. soldered, to a printed circuit board, such that a pushing force directed essentially perpendicular to the switch presses a flexible, e.g. dome-shaped, substrate with a contact layer on the underside against another contact layer.

The actuating members can extend through separate openings in the housing wall. In this way, it is easier to make a clear distinction between the actuating members.

According to a preferred embodiment, the first actuating member comprises a first push button, which is accessible from the outside of the housing.

The second actuating member may comprise a second push button, which is accessible from the outside of the housing.

According to an alternative embodiment, the second actuating member comprises a slider button, which is accessible from the outside of the housing.

According to another specific embodiment, a movable common switch member is provided between the actuating members and the momentary switch, so that the switch member actuates the momentary switch irrespective of which actuating member is operated. This enhances the possibilities for designing and arranging the first and the second actuator.

The second actuating member may movable in a direction essentially perpendicular to the movement direction of the first push button, wherein the second actuating members and the common switch member comprise inter-engaging ramp means. Thus, a very clear distinction between the two actuators can be obtained.

According to a preferred embodiment, a visible marking on the housing wall or the button of the second actuating member indicates that the communication device can be switched on by operating the button. In this way, the user knows that he or she can switch the communication device on by operating this button.

The communication device can be a wireless communication device.

In a specific embodiment, the communication device is a headset.

A further embodiment includes a communication device with a housing with a housing wall encapsulating a housing interior an electronic circuit arranged in the housing interior the electronic circuit including a first momentary electrical switch, a first user operated actuation member, extending through the housing which can be operated by a user from the outside of the housing, and which is adapted to actuate the first momentary switch, a second user operated actuating member extending through the housing on the same side as the first actuating member and which can be operated by a user from the outside of the housing and which is likewise adapted to actuate the first momentary switch, the second actuating member being adapted to move independently from the first actuating member, and wherein the first and second actuating member include distal portions configured to be positioned over the same switch regardless of where on the housing they are located relative to the switch, so that depressing of either button will actuate the same switch.

Also disclosed is a method of making and using this device, such as, a method of enhancing a user interface on a user wearable headset having a housing, electronic circuitry within the housing, a switch within the housing and connected to the electronic circuitry, comprising the steps of:
  a. Providing apertures in the housing to receive push buttons
  b. Locating at least two relatively adjacent push buttons in said apertures
  c. Providing a distal portions on each of said buttons capable of reaching and actuating said same switch when depressed
  So that when either of said buttons is depressed, the same switch is actuated.

The above summary is not intended to define the scope of the invention but provide an introduction to the full disclosure below and to the claims, which specifically, define the invention.

BRIEF DESCRIPTION OF THE DRAWINGS

The disclosure is explained in detail below with reference to the drawing preferred embodiments of the disclosure and in which;

FIG. 1 is a communication device in the form of a headset according to the disclosure, seen from a first angle, FIG. 2 the headset of FIG. 1 seen from a second angle, FIG. 3 the headset of the FIGS. 1 and 2 seen from the side, FIGS. 4-6 schematic sectional views through a part of the headset according to the FIGS. 1-3.

Figure 4:
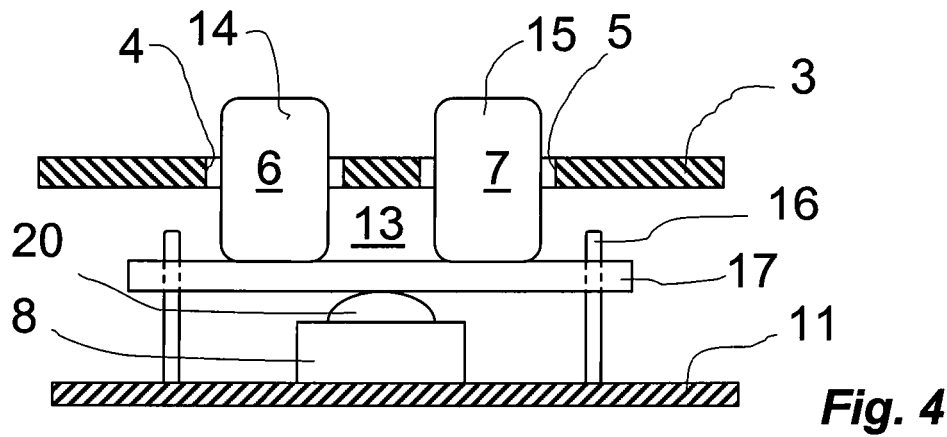

The following reference signs are used in the figures and the following detailed description of the preferred embodiment.

1 headset
2 headset housing
3 housing wall
4 first opening in housing wall
5 second opening in housing wall
6 first actuating member
7 second actuating member
8 switch
9 hinge
10 pivot base
11 printed circuit board
12 speaker tower
13 housing interior
14 first push button
15 second push button
16 guiding rod
17 common switch member
18 speaker housing
19 microphone
20 switch membrane, circuit closing member
21 inclined surface
22 slider
23 slider button
24 slider ramp
25 rounded protrusion on common switch member
26 protrusion/distal extensions
27 protrusion/distal extensions
28 common switch member
40,41, 42 traces, conductors
50 non conductive region or gap

DETAILED DESCRIPTION

FIGS. 1-3 discloses a headset 1 according to a first embodiment. The headset 1 is a wireless headset following the Bluetooth protocol. FIG. 1 discloses the headset 1 from a first side facing the head of a user during use. It comprises a headset housing 2, a speaker housing 18 to be inserted in the ear and a microphone 19. FIG. 2 discloses the headset 1 from a second side facing away from the user during use. A first push button 14 and a second push button 15 for operating the headset 1 are arranged on the second side. FIG. 3 is a side view of the headset 1, and it can be seen that the speaker housing 18 is arranged at the end of a speaker tower 12 extending from the first side of the housing 2, and that the buttons 14, 15 extend from the second side of the housing 2. The headset 1 comprises a Bluetooth transceiver and can be wirelessly connected to a mobile phone comprising a Bluetooth transceiver. As shown in FIG. 2 the first button 14 is provided with a "phone handset" symbol, which indicates, that the user can use this button to answer and end calls. The second button is provided with a "power on/off" symbol. Thus, the user is informed that he or she can use this button to power on and off the headset.

FIG. 4 discloses a schematic sectional view through the part of the headset 1 that comprises the buttons 14, 15. The housing 2 comprises a housing wall 3 that encapsulates a housing interior 13. The first button 14 is the end portion of a first actuating member 6 that projects through a first hole 4 in the housing wall 3. The second button 15 is the end portion of a second actuating member 7 that projects through a second hole 5 in the housing wall 3. The opposite end of the actuating members 6, 7 abuts the upper side of a movable common switch or bridge member 17. The lower side of the common switch member/bridge 17 abuts a flexible membrane 20 of a membrane switch 8, which is mounted on a printed circuit board 11. Guiding rods 16 extend essentially perpendicular from the printed circuit board 11 through holes in the common switch member 17. The membrane switch 8 is a push-to-make switch, which is open (off) when the membrane 20 is not pressed down.

Figure 5:
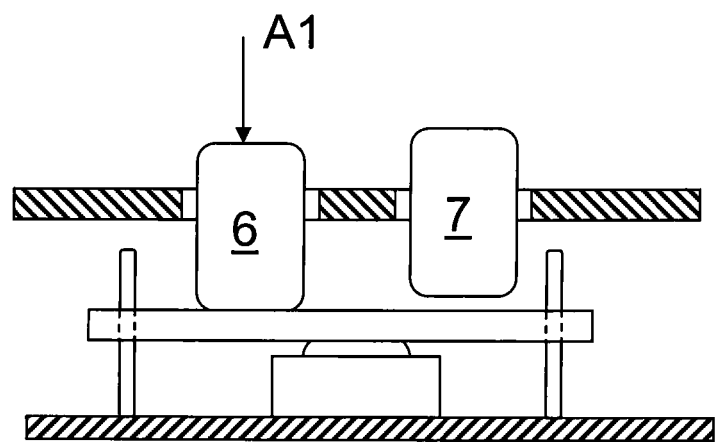
Figure 6:
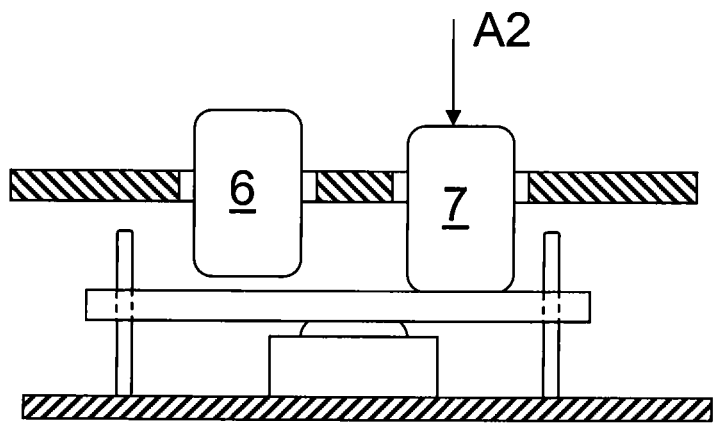

The arrow A1 in FIG. 5 indicates a pushing force pressing the actuating member 6 down, which again presses the common switch member or bridge 17 down. The common switch member 17 presses the membrane 20 down and closes the switch 8. In FIG. 6, a pushing force A2 presses the second actuating member 7 down with the same result that the switch 8 is closed. Thus, the user can operate the same switch with two different buttons 14, 15. The result to be achieved depends on how or how long the buttons are pressed. If the headset is switched off and the user exerts a long press (more than three seconds) on the second button 15 (the power on/off button), the headset is switched on. If the headset is connected to a mobile phone and there is an incoming call, the user can tap (press less than 0.5 second) the first button 14 to receive the call and tap the first button 14 again to end the call. A long press (more than three seconds) on the second button 15 switches the headset 1 off. Off course, other pressing patterns may be applied. Thus, a tap (a press for less than 0.5 seconds) may be used for switching the headset on and off and for receiving and end calls. As the two different buttons 14, 15 operates the same switch 8, the user can use the "wrong" button to obtain the desired result. But the fact, that there is a button 15, which is dedicated to switch the power on and off, makes it more intuitive for the end user to turn the headset on and off without adding significant cost to the product.

Figure 7:
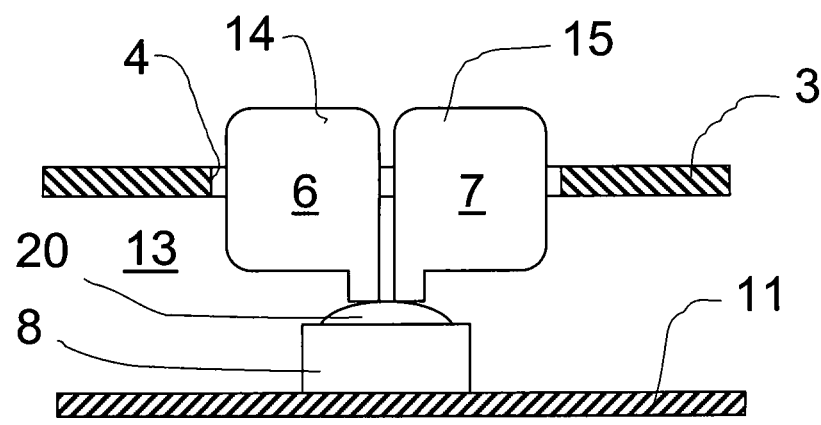
FIGS. 7-9 schematic sectional views through a part of a headset according to a second embodiment, and FIGS. 10-11 schematic sectional views through a part of the headset according to a third embodiment.
Figure 8:
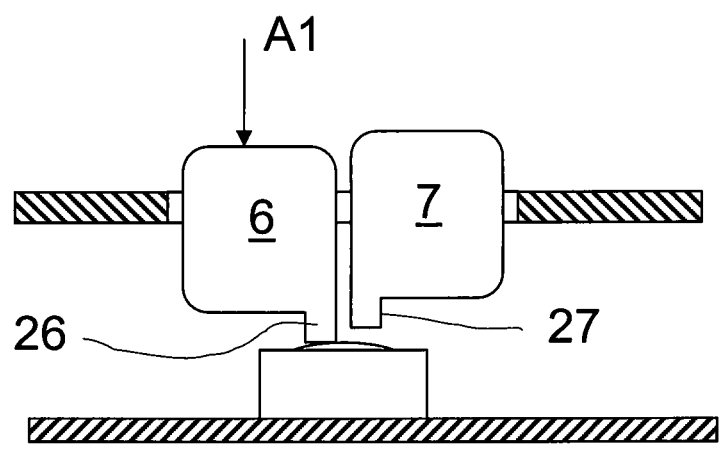
Figure 9:
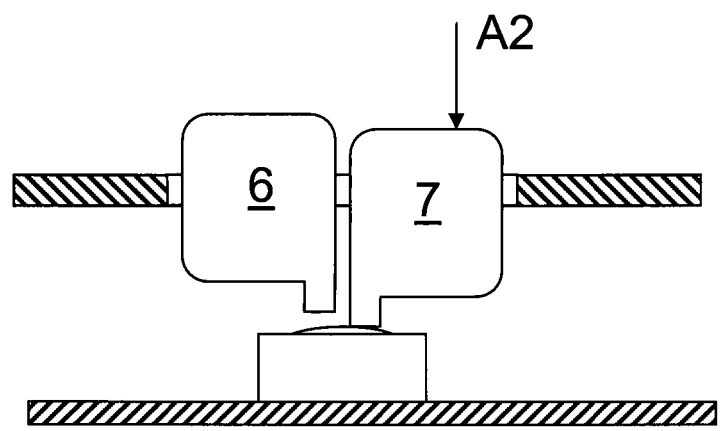

FIGS. 7-9 discloses a second embodiment, where the two actuating members 6, 7 are adjacent and extend through the same hole 4 in the housing wall 3. Each actuating member 6, 7 is at the end opposite the push buttons 14, 15 provided with a distal extensions or protrusion 26, 27, which is adapted to push the switch membrane 20 down when the push button 14, 15 is pressed down. These distal extensions protrude from the lower part (most adjacent the switch) of the buttons and are in this embodiment, preferably offset, to left and right sides so that when the buttons are adjacent, the extensions are likewise adjacent despite the fact that they are narrower than the button bodies themselves. This make actuation of a single switch possible with buttons which are otherwise to wide to hit the same actuation pad/membrane on the switch.

The first and second actuating members/buttons are configured to be able to actuate the same switch regardless of where on the housing they are located relative to the switch. This is accomplished in different ways in different embodiments. As mentioned above, in one embodiment, the location of the distal extensions provide this. These extensions can have a lateral portion (not shown) in order to reach the switch from a most distant location on the housing. In another embodiment, bridge 17 helps achieve the same result.

Contrary to the first embodiment, this embodiment does not include a common switch member or bridge 17. In FIG. 7, none of the push buttons 14, 15 is pressed down. In FIG. 8, the first push button 14 is pressed down, and in FIG. 9, the second push button 15 is pressed down.

Figure 10:
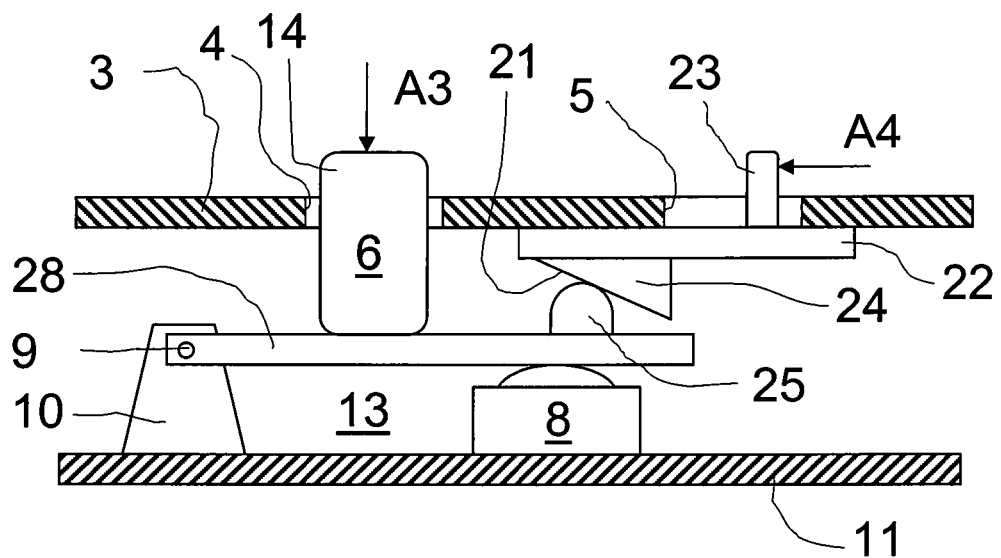
Figure 11:
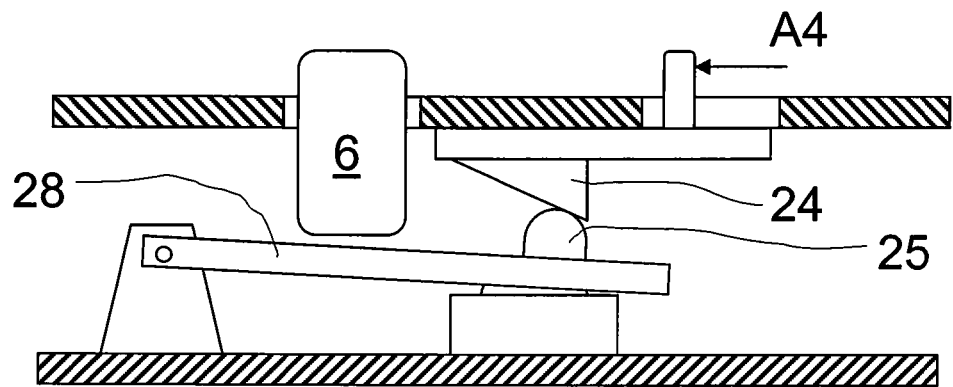

FIGS. 10 and 11 disclose a third embodiment. In this embodiment, the first actuating member 6 is similar to the first actuating member 6 in the first embodiment and extends through a first hole 4 in the housing wall 3. The second actuating member is embodied as a slider 22 with a slider button 23 that extends trough a second hole 5 in the housing wall 3. The opposite side of the slider 22 has a slider ramp 24 with an inclined surface 21. A common switch member 28 is pivotally mounted on pivot base 10, which is mounted on the printed circuit board 11. At a first end, the switch member 28 can pivot about a pivot 9 of the pivot base 10. The second end of the switch member 28 rests on the membrane switch 8. At the second end, the upper side of the common switch member 28 is provided with a rounded protrusion 25, which is adapted to engage the inclined surface 21 of the slider ramp 24. When the slider button 23 is pushed by a pushing force A4 in a direction parallel with the housing wall 3, the inclined surface 21 forces the rounded protrusion 25 and thereby the second end of the common switch member 28 downwards. This causes the switch 8 to close, which is shown in FIG. 11. If the push button 14 of the first actuating member 6 is pressed down by a pushing force A3, the switch 8 is also closed.

The figures are schematic and parts are left out for clarity. For example, means to prevent the actuating members 6, 7 from falling out of the housing 2 should be provided. Also biasing means for keeping the actuating members in a "non-activated" original position should be provided. However, these measures are easy to carry out for a person skilled in the art and will not be explained further here.

The disclosure is not limited to only two actuating members. Three, four and even more actuating members could be arranged to actuate the same switch.

The disclosure is also not limited to, but may be especially suitable for small communication devices like headsets, especially small Bluetooth headsets. However, the disclosure could also be utilized with other small devices, especially battery-powered devices such as mobile phones, digital cameras, handheld navigation devices etc.

Figure 12:
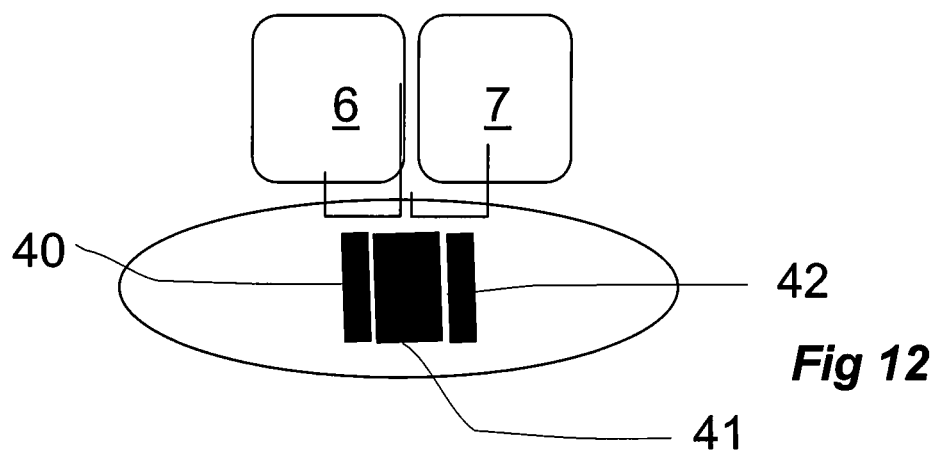
FIG. 12 is a schematic view of an alternate embodiment with a three conductors switch.

It is possible to further enhance the functionally of the disclosed concepts without appreciably increasing the cost of manufacture, by providing a switch 8 with at least three conductors 40, 41, 42 (traces if a printed circuit board switch) as shown in FIG. 12. With three conductors, two buttons can have three distinct functions if the buttons only close the circuit of two conductors per button. For example in FIG. 12, button 6 could connect a left and center conductor, while button 7 could close a center and right conductor. Pressing both buttons together, would short all three together. Further functions can also achieved by sequential pressing of buttons 6 then 7 and then 6+7 together, or 7, then 6 and then 6+7 together. Circuitry can be used to monitor which circuits are closed and in what sequence to achieve many more function out of three or more conductors.

Figure 13:
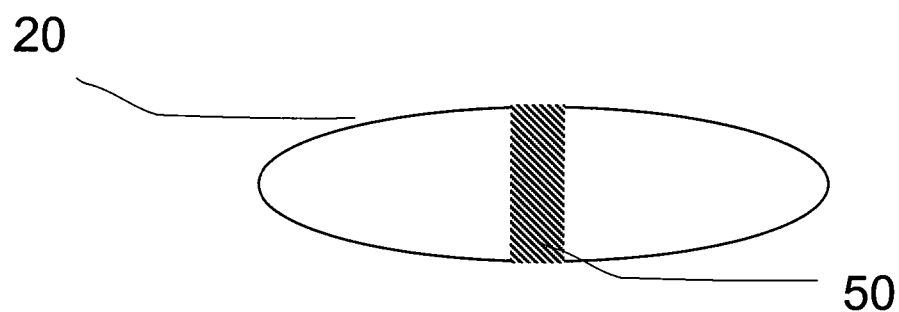
FIG. 13 is a schematic view of the membrane for the view in FIG. 12 with a non conductive portion 50.

The separate closing of circuits with three or more conductors (40, 41, 42 where 41 is wider and wide enough to be reached by the distal ends of both buttons) is achieved by either using a membrane 20 which is flexible enough that pressing of on button but not cause shorting of all conductors, but only the two most adjacent the button, or by providing a membrane with segmented (side by side conductive segments—see FIG. 13) to have two conducted portions separated by a non-conductive portion. FIG. 13, illustrates a split membrane where black bar 50 illustrates the non conductive portion whereas either side of 50 are conductive.

Figure 14:
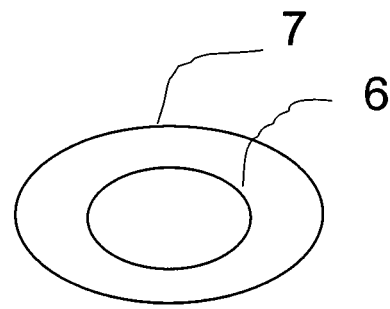
FIG. 14 is a schematic top view of a pair of buttons in a concentric configuration.

In addition to a side by side conductive membrane, the membrane could have concentric buttons 6 and 7 in FIG. 14, which have distal ends (not shown) similar to previous embodiments, but concentric and likewise the traces on the switch could be stripes as in FIG. 12 or concentric regions. The membrane 20 could have a concentric non conductive region like bar 50 but configured for concentric buttons. In such a configuration pressing the inner button would connect a central conductor with a first concentric ring, and pressing the outer concentric button would connect an inner ring with an outer ring and pressing both together would connect all three conductors.

Like the buttons can be hemispheres where their flat wall in abutment to that together they form a single cylindrical button making depressing both simultaneously quite easy.

A method of making and using such configurations is also part of this disclosure.

The above disclosure does not define the invention. That is found in the claims. The disclosure and claims should be given the broadest possible interpretation and include substitutable features even is not specifically called out herein.

The invention claimed is:

1. A communication device comprising a housing with a housing wall encapsulating a housing interior, an electronic circuit arranged in the housing interior, the electronic circuit including
   a first momentary electrical switch,
   a first user operated actuation member, extending through the housing which can be operated by a user from the outside of the housing, and which is adapted to actuate the first momentary switch;
   a second user operated actuating member extending through the housing on the same side as the first actuating member and which can be operated by a user from the outside of the housing and which is likewise adapted to actuate the first momentary switch;
   the second actuating member being adapted to move independently from the first actuating member,
   and wherein the first and second actuating member include distal portions configured to be positioned over the same switch regardless of where on the housing they are located relative to the switch
   so that depressing of either button will actuate the same switch.

2. A communication device according to claim 1, wherein the actuating members extend through separate openings in the housing wall.

3. A communication device according to claim 1, wherein a laterally movable common switch member is provided between the actuating members and the momentary switch (8), so that the switch member actuates the momentary switch irrespective of which actuating member is operated.

4. A communication device according to the claim 3, wherein the second actuating member is movable in a direction essentially perpendicular to the movement direction of the first push button), and wherein the second actuating member and the common switch member (17) comprise inter-engaging ramp means.

5. The device according to claim 4 where said actuating members are push buttons and wherein the distal portions are configured to be positioned adjacent and just above said switch.

6. The device according to claim 4 wherein further including a bridge member located above said switch and interposed between said switch and said actuating member, and wherein the distal ends of said actuating member engage said bridge, which in turn actuates the switch, when depressed.

7. The device according to claim 5 wherein said bridge includes first and second ends and further includes a generally orthogonal support slideably passing thru the bridge thereby stabilizing said bridge so that it will actuate said switch regardless of where along the bridge the distal ends contact it.

8. A communication device comprising a housing with a housing wall encapsulating a housing interior, an electronic circuit arranged in the housing interior, the electronic circuit including
  a first momentary electrical switch,
  a first user operated actuation member, extending through the housing for movement generally orthogonal to the housing, which can be operated by a user from the outside of the housing, and which is adapted to actuate the first momentary switch;
  a second user operated actuating member extending through the housing on the same side as the first actuating member,
  the second actuating member being adapted to move independently from the first actuating member,
  a slideable bridge member located above said switch and interposed between said switch and said actuating member, said bridge member being slideable in the direction of movement of the actuating members, and wherein the distal end of said first and second actuating members engages said bridge, which in turn actuates the switch, when depressed.

9. The communication device according to claim 8 wherein said second actuating member is configured to slide generally laterally within the housing and which can be operated by a user from the outside of the housing and which includes a ramp member on its distal end likewise adapted to actuate the first momentary switch and wherein said bridge further including a protrusion extending upwardly from said bridge proximate said ramp, so that when said second actuating member is slid laterally, the ramp engages said protrusion and causes the bridge to actuate the switch.

10. A device according to claim 4 wherein said switch includes at least three adjacent spaced apart electrical conductors and a conductive circuit closing member resiliently spaced apart and above said conductors, and wherein said distal end of said first actuating member is positioned to engage, when depressed, said closing member such that only two of said at least three conductors is bridged by said closing member, and wherein said second actuating member is positioned to engage, when depressed, said closing member such that only two of said at least three conductors is bridged by said closing member.

11. A device according to claim 10 wherein said conductive circuit closing member is a flexible membrane having two conductive portions separated by a non-conductive portion, and where the one of the conductive portions is positioned to be engaged by the first actuating member and the other portion is positioned to be engaged by the second actuating member when depressed, thereby closing separate pairs of conductors within the switch.

12. A device according to claim 4, wherein said first and second actuating members are concentric with respect to each other.

\* \* \* \* \*